United States Patent

[11] 3,617,620

[72] Inventor Ichiro Arimura
Kyoto, Japan

[21] Appl. No. 724,992
[22] Filed Apr. 29, 1968
[45] Patented Nov. 2, 1971
[73] Assignee Matsushita Electric Industrial Co., Ltd.
Osaka, Japan
[32] Priorities May 8, 1967
[33] Japan
[31] 42/29622;
Aug. 3, 1967, Japan, No. 42/50447; July 4, 1967, Japan, No. 42/43758

[54] METHOD AND APPARATUS FOR TRANSMITTING OR RECORDING AND REPRODUCING LINE-SEQUENTIAL COLOR TELEVISION SIGNALS
5 Claims, 46 Drawing Figs.

[52] U.S. Cl. ........ 178/5.2 R, 178/5.4 HE, 178/5.4 CD
[51] Int. Cl. ........ H04n 9/40, H04n 9/50
[50] Field of Search ........ 178/5.4 CR, 5.4 C, 5.4 S, 5.2, 69.5 N

[56] References Cited
UNITED STATES PATENTS

| | | | |
|---|---|---|---|
| 2,698,355 | 12/1954 | Sleeper, Jr. | 178/5.4 SY |
| 2,709,717 | 5/1955 | Werenfels | 178/5.2 |
| 2,986,597 | 5/1961 | Teer | 178/5.2 |
| 2,993,086 | 7/1961 | DeFrance | 178/5.2 |
| 3,170,991 | 2/1965 | Glasgal | 179/1.3 |
| 3,436,469 | 4/1969 | Nakazawa | 178/5.2 |
| 3,440,340 | 4/1969 | Sugihara | 178/5.4 |

*Primary Examiner*—Robert L. Griffin
*Assistant Examiner*—John C. Martin
*Attorney*—Stevens, Davis, Miller & Mosher

ABSTRACT: A transmission system wherein a color signal to be transmitted or recorded is separated into a luminance signal and two chrominance signals, said luminance signal is always transmitted or recorded while said two chrominance signals are line-sequentially transmitted or recorded alternately for every horizontal scanning period, and index pulses representing the scan for either one of said two chrominance signals are inserted in the horizontal synchronizing pulses contained in said luminance signal, thereby facilitating the conversion of line-sequential signals to simultaneous signals.

INVENTOR
ICHIRO ARIMURA

BY Stevens, Davis, Miller & Mosher

ATTORNEYS

INVENTOR
ICHIRO ARIMURA

BY

ATTORNEYS

INVENTOR
ICHIRO ARIMURA

BY

ATTORNEYS

INVENTOR
ICHIRO ARIMURA

BY Stevens, Davis, Miller & Mosher

ATTORNEYS

INVENTOR
ICHIRO AKIMURA

BY

ATTORNEYS

INVENTOR
ICHIRO ARIMURA

BY

ATTORNEYS

INVENTOR

ICHIRO ARIMURA

BY

ATTORNEYS

INVENTOR
ICHIRO ARIMURA

BY

ATTORNEYS

INVENTOR
ICHIRO ARIMURA

BY Stevens, Davis, Miller & Mosher

ATTORNEYS

METHOD AND APPARATUS FOR TRANSMITTING OR RECORDING AND REPRODUCING LINE-SEQUENTIAL COLOR TELEVISION SIGNALS

This invention relates to a method and apparatus for transmitting or recording and reproducing line-sequential color television signals, and more particularly it pertains to a system and apparatus concerned with a line-sequential conversion method, white-balance method, color control method, modulation recording-reproducing method, etc. which are conveniently utilized in recording or reproducing luminance signals and two types of chrominance signals available from a color signal source such as color camera in a wide-band signal recording and reproducing apparatus including a magnetic tape and one or a plurality of magnetic transducers.

In a conventional magnetic recording and reproducing apparatus capable of recording wide-band signals, a color subcarrier tends to be influenced by time variations during the playback operation of the apparatus even if the recording-playback frequency band is sufficient when any of NTSC-type composite signals, PAL-type composite signals, etc. is to be recorded and reproduced, so that color reproduction with fidelity cannot be achieved.

In order to achieve such reproduction, elaborate means for correcting time variations is required.

In the line-sequential system (SECAM), use is made of a complex method such as the method of converting chrominance signals I and Q available from the color camera through a matrix circuit to line-sequential signals, the method of finely controlling the colors by the chrominance signals, of the method of finely controlling the conditions for modulation as the line-sequentially converted signals are superimposed upon the high-frequency band of the luminance signals by the use of such a carrier, etc.

Accordingly, it is a primary object to eliminate the aforementioned drawbacks of the prior art.

Another object of this invention is to provide an all-round transmitting and receiving system for the line-sequential color television system.

Still another object of this invention is to provide a color video recording apparatus of the above type capable of recording and reproducing wide-band signals, which includes a magnetic tape and one or a plurality of magnetic transducers, wherein the two types of chrominance signals according to any of the aforementioned color systems are converted to line-sequential signals and superimposed upon the high frequency components of the luminance signals together with the subcarrier and the resulting line-sequential composite signals are recorded or reproduced.

A further object of this invention is to provide a novel color-controlling method for the color television receiver system for reproducing color picture by processing a luminance signal and two chrominance signals.

A still further object of this invention is to provide a white-balance method of keeping the mean values of the chrominance signals constant in the aforementioned type of line-sequential color television system.

Other objects, features and advantages of this invention will become apparent from the following description taken in conjunction with the accompanying drawings, in which.

Figure 8A:
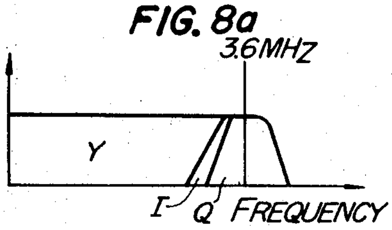
Figure 8B:
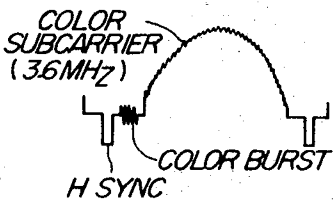
Figure 9A:
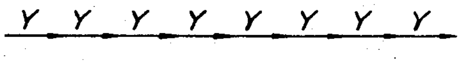
Figure 9B:
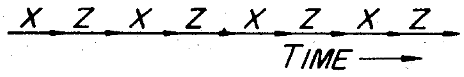
Figure 9C:
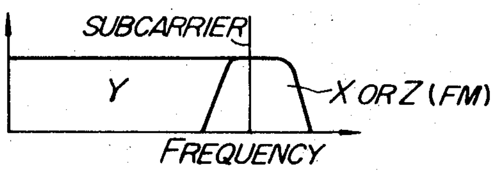
Figure 9D:
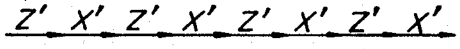
Figure 10:
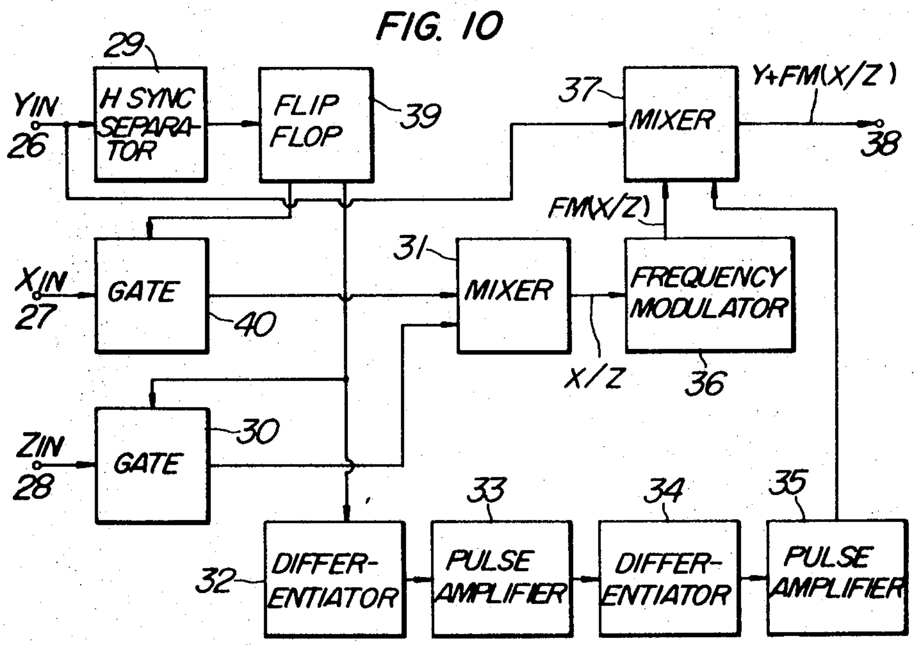
Figure 13L:
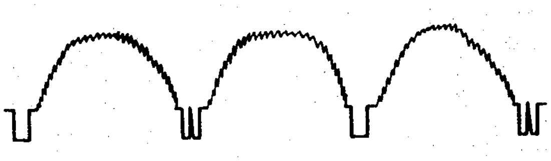
Figure 12:
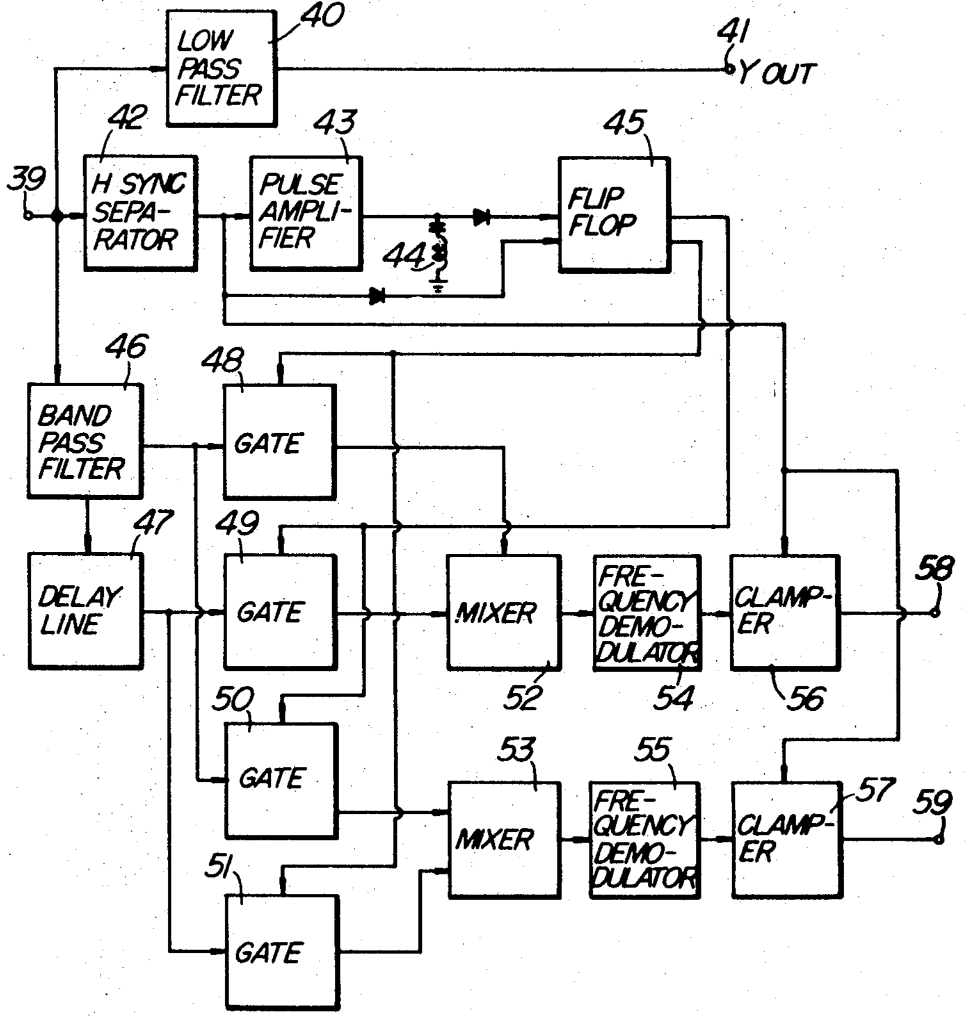
Figure 14A:
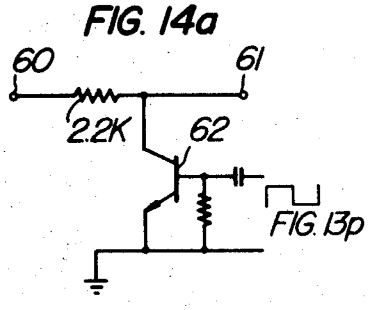
Figure 14B:
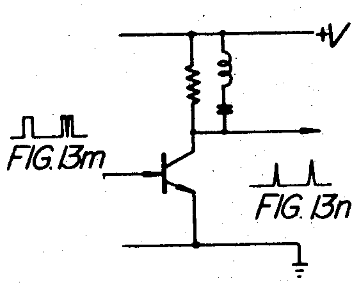
Figure 15Q:
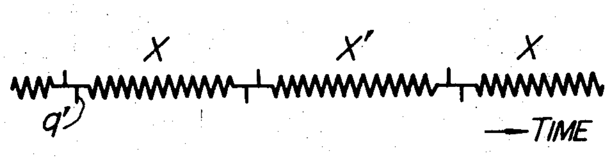
Figure 15R:
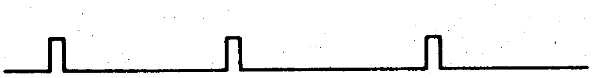
Figure 20:
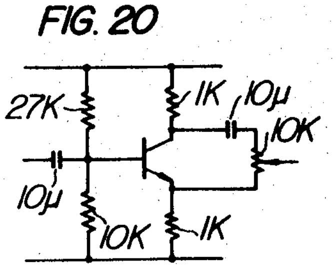
Figure 16:
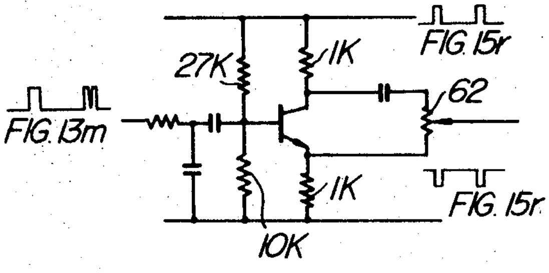
Figure 17:
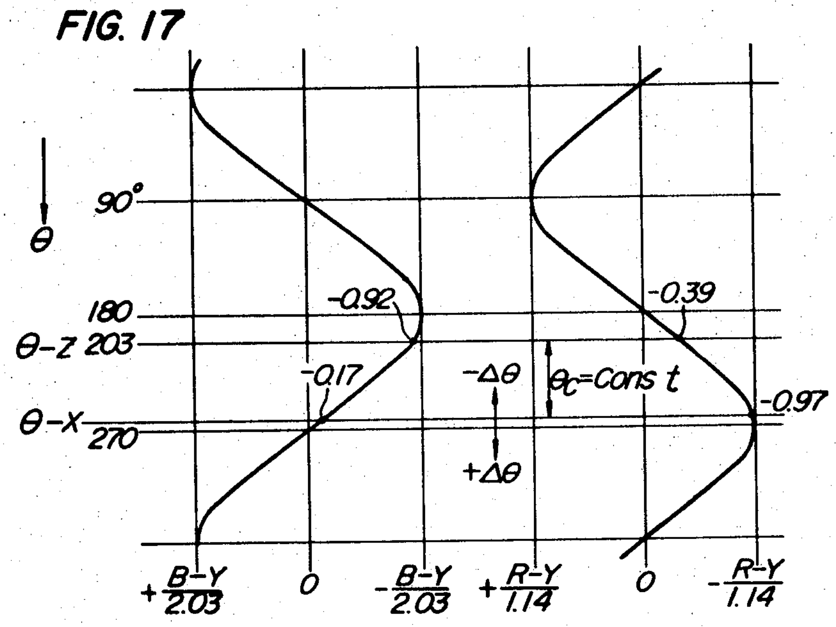
Figure 18:
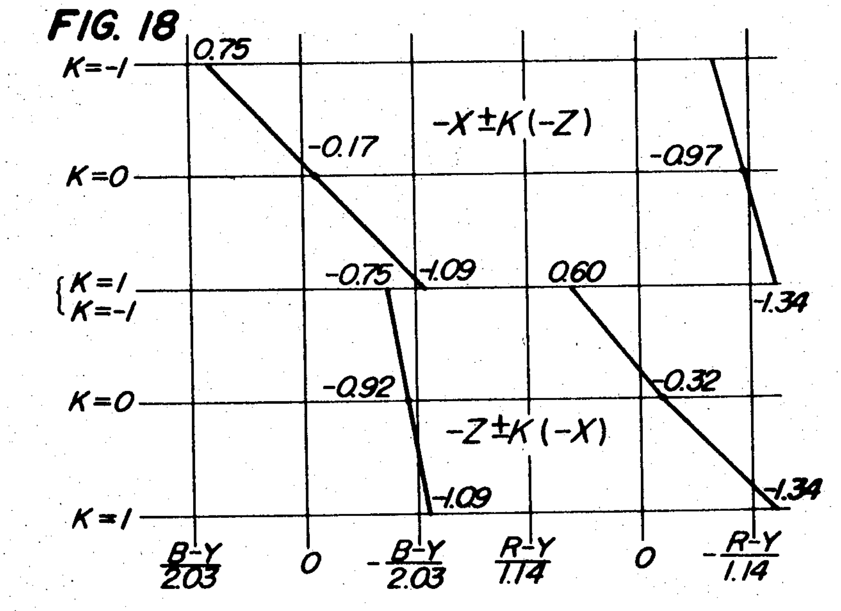
Figure 19:
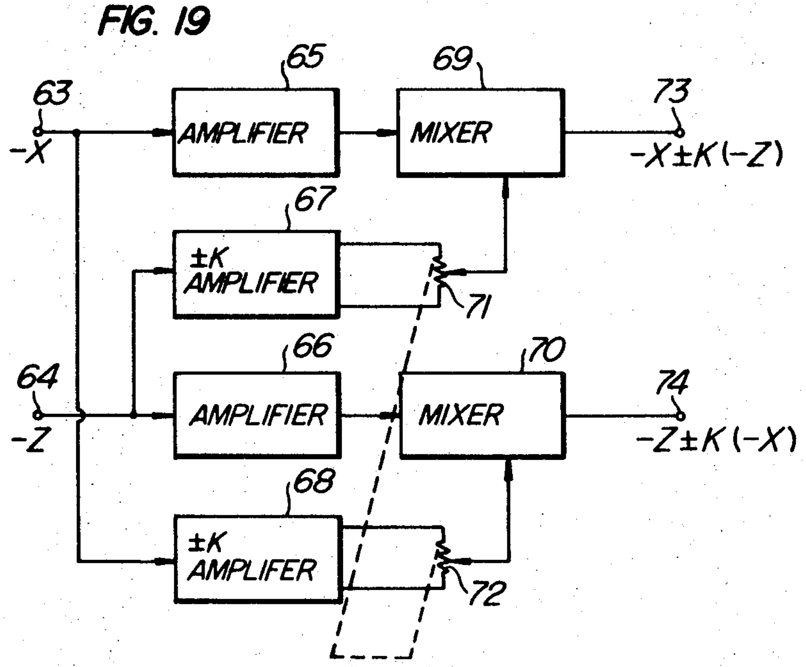
Figure 21:
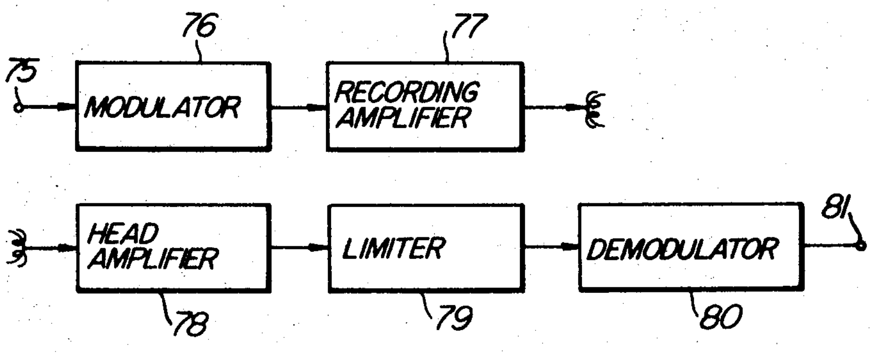
Figure 21:
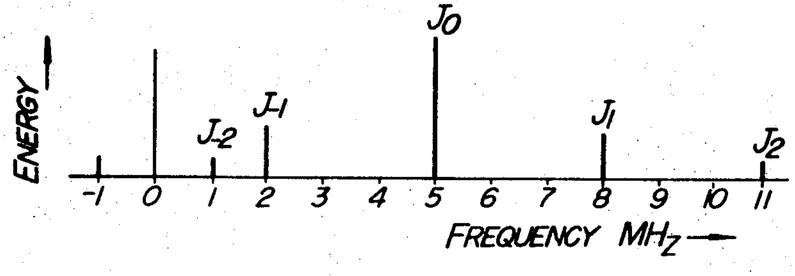
Figure 22:
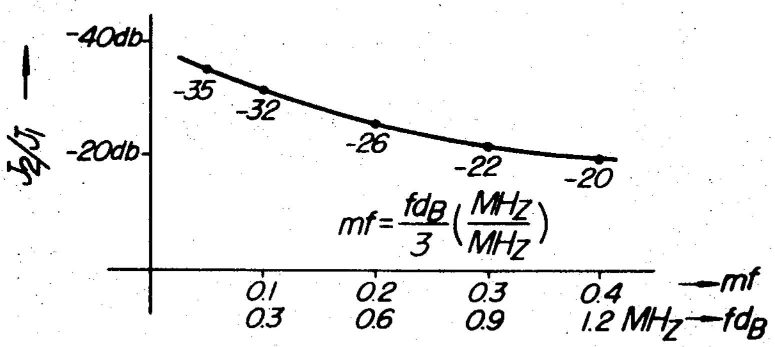

FIGS. 8*a* and 8*b* schematically show the spectrum and waveform of an NTSC-system composite color television signal;

FIGS 9*a* to 9*d* are schematic views showing the time-series arrangements of signals and spectrum of a line-sequential composite signal, illustrating the principles of the conversions to line-sequential and simultaneous signals on which the present invention is based;

FIG. 10 is a block diagram illustrating the circuit for the method of converting signals to line-sequential signals in accordance with the present invention;

FIGS. 11*e* to 11*l* are views showing the waveforms appearing in the respective blocks of FIG. 10;

FIG. 12 is a block diagram illustrating the circuit for the method of converting signals to simultaneous signals in accordance with the present invention;

FIGS. 13*l'* to 13*p*are views showing the waveforms appearing in the respective blocks of FIG. 12;

FIGS. 14*a* and 14*b* are circuit diagrams showing part of the circuits shown in FIGS. 10 and 12, respectively;

FIGS. 15*q* to 15*r'* are schematic views illustrating a converted simultaneous signal and waveforms appearing in the circuit of FIG. 16;

FIG. 16 is a circuit diagram showing the circuit for carrying out the white-balance method according to the present invention;

FIG. 17 is a graph illustrating the levels of signals B–Y, R–Y as an NTSC-system composite color television signal is demodulated to signals X, Z;

FIG. 18 is a graph illustrating the principle of the color-controlling method according to the present invention, in contrast with FIG. 17;

FIG. 19 is a block diagram showing the circuit for the color-controlling method according to the present invention;

FIG. 20 is a circuit diagram showing part of the circuit shown in FIG. 19;

FIG. 21 is a block diagram showing an example of FM-recording and reproducing circuit for use with a wide-band magnetic recording and reproducing apparatus;

FIG. 22 is a circuit diagram showing part of the circuit shown in FIG. 21; and

FIGS. 23*s* to 23*v* are views illustrating another method of forming index pulses, wherein waveforms appearing in the respective portions are shown.

Before the present invention is explained, description will be made of an example of a conventional magnetic recording and reproducing apparatus including two rotary magnetic head, with reference to FIGS. 1 to 4.

Figure 1:
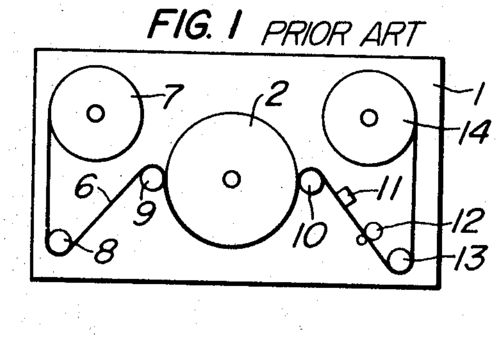
FIG. 1 PRIOR ART
FIG. 1 is a schematic plan view showing a conventional magnetic recording and reproducing apparatus including two rotary magnetic heads.
Figure 2:
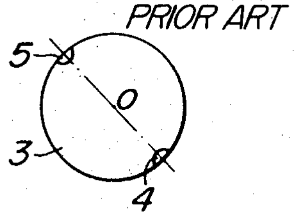
FIG. 2 PRIOR ART
FIG. 2 is a plan view of a rotary disk constituting part of the mechanism shown in FIGURE 1.
Figure 3:
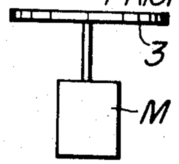
FIG. 3 PRIOR ART
FIG. 3 is an elevational view of the disk shown in FIG. 2.
Figure 4:
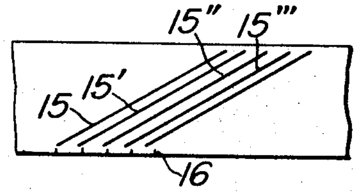
FIG. 4 PRIOR ART
FIG. 4 is a view useful for explaining recording tracks formed on a magnetic tape by the apparatus shown in FIG. 1.
Figure 5:
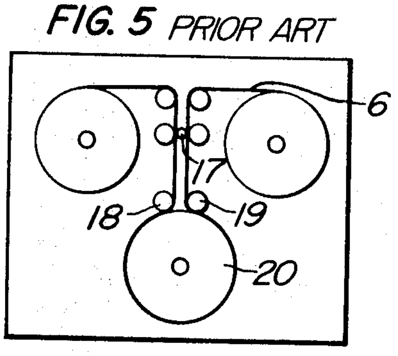
FIG. 5 PRIOR ART
FIG. 5 is a schematic plan view showing a conventional magnetic recording and reproducing apparatus including a single rotary magnetic head.

A base-plate 1 is referred to commonly as tape transport panel. The reference numeral 2 represents a cylindrical tape guide incorporating a rotary head drum 3 as shown in FIG. 2 and being formed with a gap out of which are projected the fore-ends of magnetic heads 4 and 5 provided on the rotary head drum. The axis of the tape guide is slightly tilted with respect to the baseplate 1. Thus, the rotary head drum 3 provided coaxially with respect to the tape guide 2 and a motor M for driving the rotary drum are similarly tilted. A magnetic tape 6 is transported from a supply reel 7 and brought into contact with the tape guide 2 through a first idler 8 of which the axis is perpendicular to the baseplate 1 and a second idler 9 which is tilted through the same angle as the tape guide 2 with respect to the baseplate 1. In this way, recording or reproduction is effected on the magnetic tape by the magnetic heads 4 and 5 mounted on the rotary disk 3. Thereafter, the tape is wound onto a takeup reel 14 through the opposite end of said guide, a third idler 10, a control signal head 11, a capstan mechanism 12 and a fourth idler 13. The rotary disk 3 has a center shaft 0 and the two magnetic heads 4 and 5 arranged on a diametrical line, as shown in FIGS. 2 and 3. It is driven by a synchronous or similar motor M. Since the rotary disk 3 is slightly tilted with respect to the path of the tape, it is apparent that adjacent two magnetized tracks 15 and 15' are formed on the magnetic tape by the magnetic heads 4 and 5 respectively as shown in FIG. 4, with the magnetic tape 6 being transported along the circumference of the rotary disk 3. In order to strictly retrace the magnetized tracks during the playback operation, control signals 16 recorded in the lower edge portion of the magnetic tape 6 is reproduced as reference signals during the recording operation, thereby controlling the rotation of the rotary disk or capstan. With the Japan-U.S. standard television system, television information corresponding to one field is recorded in each track on the magnetic tape if the rotational frequency of the rotary disk is set to 1,800 r.p.m. In practice, the rotary disk is rotated in synchronism with the vertical synchronizing signals of a Japan-U.S. standard television signal, and the rotational phase of the rotary disk is so controlled that the components of the signal in the neighborhood of the vertical synchronizing signals are recorded in the tape edge portions of said tracks. Thus, no track-changing portions appear in a reproduced picture. In a magnetic recording and reproducing apparatus including a single rotary magnetic head, the magnetic tape 6 is wound on the substantially overall circumference of rotary disk 20 through a capstan 17 and two idlers 18 and 19. The rotational frequency of the rotary disk 20 is 3,600 r.p.m. For one revolution of the disk, a signal corresponding to one field is recorded.

Prior to the explanation of the present invention, description will be made of problems involved in the recording and playback of color television signals.

The common principle of the color television systems such as NTSC, PAL, SECAM, etc. is the so-called color subcarrier system wherein color information signals which are produced by quadrature-balance-modulating chrominance signals I, Q with 3.58 MHz as the center frequency of color information signals or by frequency-modulating color difference signals R–Y, B–Y for every horizontal scanning period with 4.43 MHz as the center frequency are superimposed upon the higher components of the luminance signal information band. Such signals are subjected to time-axis distortion or phase distortion when they are recorded or reproduced by a wide-band magnetic recording and playback apparatus. These distortions occur in the transmission route for the recording and playback. Especially, there is a tendency that the subcarrier is subjected to time variations in magnetic recording and reproducing system and phase change occurs within the necessary band due to the nonlinearity of the recording-playback system. This results in color irregularities, which have adverse effect on a reproduced picture.

In recording composite signals according to the NTSC, PAL (with the SECAM, said distortions rarely occur), it is necessary that the modulation index of the modulator of a magnetic recording-reproducing apparatus be reduced or complex time-variation correcting means be used.

In accordance with the present invention, there is provided a novel method which comprises separating a luminance signal and two chrominance signals from a composite color television signal, converting the two chrominance signals to line-sequential signals and then frequency-modulating the resultant line-sequential signals on high frequency components of the luminance signal to produce a multiplex compound signal to be transmitted or recorded and reproduced, thereby eliminating the aforementioned difficulties and simplifying the circuit arrangement.

Figure 7:
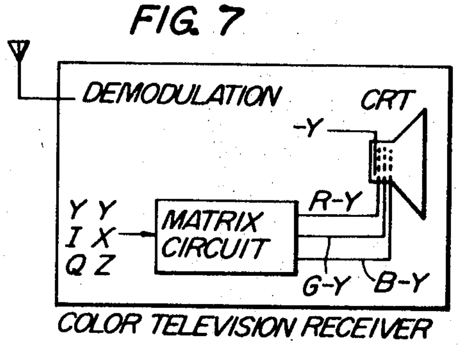
FIG. 7 is a schematic view useful for explaining demodulated signals in a color television receiver.
Figure 6:
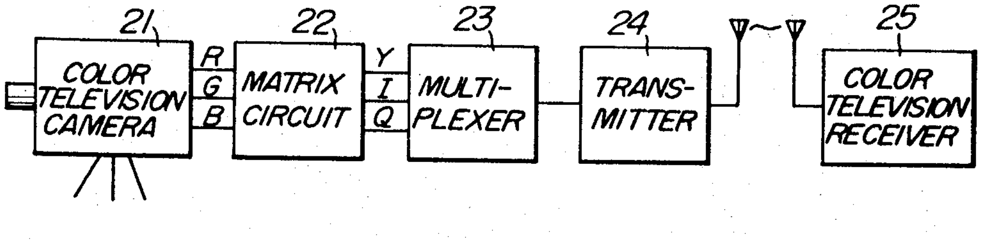
FIG. 6 is a schematic diagram showing the transmission and reception routes for a color signal.

The outline of the present invention will now be described relative to the NTSC color television system, for example, prior to detailed explanation of the circuit arrangement. Referring to FIG. 6, chrominance signals R, G, B available from a color camera 21 is converted to a signal ($l$G+$m$R+$n$B) which is linear relation between R, G and B, luminance signal Y and two chrominance signals I and Q in a matrix circuit 22, superimposed upon the subcarrier and then combined with each other in a multiplexer 23 so as to be transformed into a composite color television signal as shown in FIGS 8, 8$a$ and 8$b$. Thus, the composite signal is radiated into the air by way of VHF or UHF from a transmitter 24. On the other hand, composite color television signal received by and demodulated in a receiver 25 as shown in FIG. 7 is ordinarily converted to Y, X, Z or color difference signals, instead of being demodulated to Y, I, Q in the receiver, the drive a cathode ray tube thereby effecting color reproduction.

With such system, if a composite color television signal is recorded or reproduced, the reference burst signals inserted at the back porch of the horizontal synchronizing signal and color subcarrier are made irrelative by the time variations occuring in the recording-playback apparatus for the reason described above, with a result that color reproduction with fidelity becomes impossible. The actual frequency change in the recording-reproducing apparatus is in a range of 0.1 to 0.3 percent, but its influence can be neglected if a frequency-modulation system which is substantially free from such influence is used in the transmission of chrominance signals. FIG. 9 shows the basic principles of the conversions to a line-sequential signal and simultaneous signal. Assume that the signals to be handled are Y, X and Z signals taken from a color camera or a receiver. In the case of the conversion to the line-sequential signal, Y signals are always present as shown in FIG. 9$a$, while the chrominance signals X and Z are switched at every horizontal scanning line (at every one H), as shown in FIG. 9$b$, and they are frequency-modulated on a suitable carrier and superimposed on the higher frequency regions so as to be converted to a composite signal as shown in FIG. 9$c$.

When this new line-sequential composite color signal is transmitted and received, it is delayed by a period of time corresponding to one horizontal scan through the use of a 1H delay line, as shown in FIG. 9$d$, so that simultaneous signals Y, X, Z′ or Y, X′, Z each containing one delayed chrominance signal are formed by nondelayed line-sequential chrominance signals (FIG. 9$b$) and delayed chrominance signals (FIG. 9$d$). It is well known in the art that a picture can be satisfactorily appreciated even if its vertical resolution is reduced by half, as with the principle of high-mix in color television. By the same reasoning, the resultant simultaneous signals containing one delayed chrominance signal can be satisfactorily used as signals for color reproduction. In accordance with the present invention, there are proposed methods for facilitating the construction of a practical apparatus such as method of inserting and extracting index pulses which can be conveniently utilized in the system for the conversion to line-sequential or simultaneous signals, white-balance method for maintaining the mean values for Y, X, Z in the conversion to line-sequential or simultaneous signals, method of controlling colors with the X, Y, Z signal arrangement, modulation method for recording reproducing line-sequential signals, etc. With reference to the drawings, description will now be made of the circuit arrangement according to the present invention and operating waveforms.

FIGS. 10 and 11 show a circuit arrangement for the conversion to line-sequential signals and operating waveforms, respectively. Signals Y, X, Z are supplied to input terminals 26, 27 and 28 respectively, and horizontal synchronizing signals (FIG. 11$f$) are extracted from Y through a horizontal sync-separator 29 to trigger a flip-flop 39. Two outputs (the output as shown in FIG. 11$g$ and that which is 180° out of phase therewith) of the flip-flop 39 alternately open and close gates 40 and 30 so that signals having spaces corresponding to 1H such as X_X_,_Z_Z_, which are converted to line-sequential chrominance signals X, Z, X, Z, ....X/Z by a mixer 31. The X/Z signal is modulated on a suitable carrier in an FM-modulator 36, and the resulting FM (X/Z) signal is mixed with the Y-signal in a mixer 37 as shown in FIG. 11$l$ so that a line-sequential combined signal Y+FM (X/Z) is taken from an output terminal 38. On the other hand, in order to produce index pulses, one of the two outputs (output as shown in FIG. 11$g$ and that which is 180° out of phase therewith) is passed through a differentiator 32, and the differentiated waveform is so adjusted that the width of output of a pulse amplifier 33 is in a range of 1 to 1.5 microseconds as shown in FIG. 11$i$. The differentiated waveform is again differentiated by a differentiator 34 and the output (FIG. 11*j*) of the latter is transformed to pulses with a width of 1 to 1.5 microseconds by a pulse amplifier 35 as shown in FIG. 11*k*. The resulting pulses are delayed by 1–1.5 microseconds with respect to the fore edge of the horizontal synchronizing pulses. The pulses shown in FIG. 11*k* are mixed with the horizontal synchronizing pulses in a mixer 37 during the conversion to line-sequential signals. The resulting waveform is as shown in FIG. 11*l*. By inserting such index pulses, it is possible to select either one of the line-sequential chrominance signals X and Z during the conversion to simultaneous signals.

FIGS. 12 and 13 show the circuit arrangement for the conversion to simultaneous signals and operating waveforms, respectively. Line-sequential combined signal Y+FM (X/Z) (FIG. 13*l*′) is supplied to an input terminal 39′ through a wide band magnetic recording and reproducing apparatus or any other transmission system. It is first passed through a low pass filter 40′ for the purpose of cutting off the FM (X/Z) signal, so that only the Y-signal is taken as output from a terminal 41.

Figure 11E:
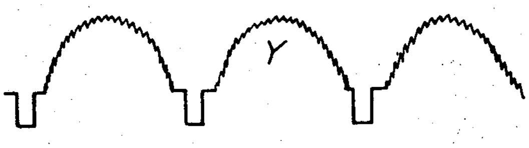
Figure 11F:
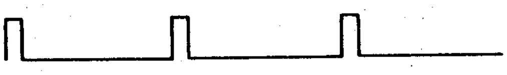
Figure 11G:
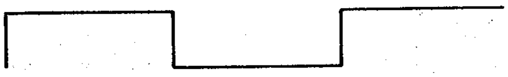
Figure 11H:
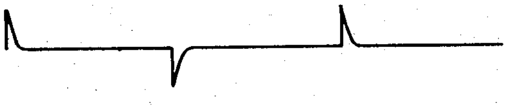
Figure 11I:
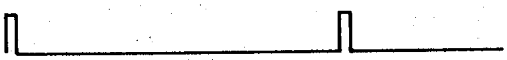
Figure 11J:
Figure 11K:
Figure 11L:
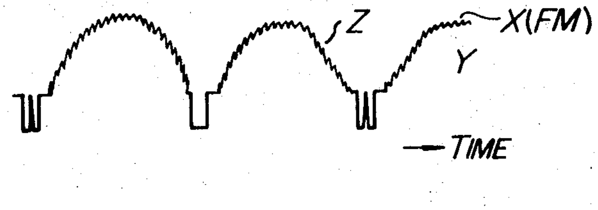
Figure 13M:
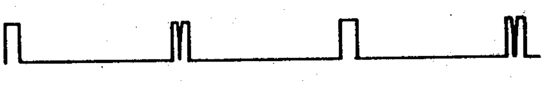
Figure 13N:
Figure 13P:
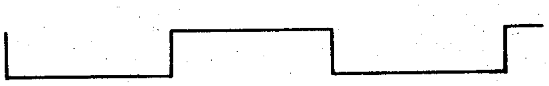

On the other hand, pulses are provided by an H sync-separator 42, as shown in FIG. 13*m*, and simultaneously the index pulses inserted in the horizontal synchronizing signals are taken out from a resonance circuit 44 through a pulse amplifier 43, as shown in FIG. 13*n*. The output waveforms shown in FIGS. 13*m* and 13*n* trigger a flip-flop 45 to drive the latter. The outputs of the flip-flop 45 are the waveform as shown in FIG. 13*p* and that which is 180° out of phase therewith. These outputs drive gates 48–51. The outputs of the flip-flop 45 (output as shown in FIG. 13*p* and that which is 180° out of phase therewith) have their polarities determined as mentioned above by the index pulses. Further, the FM (X/Z) signal is taken out by means of a band-pass filter 46, and that signal and an FM (X/Z)′ signal which is delayed by a period of time corresponding to one horizontal scanning line through a delay line 47 enter the gates 48–51 as signals to be selected. Assume that the outputs of the band-pass filter 46 and delay line 47 are XZXZXZ ..... and Z′X′Z′X′Z′X′ .... (1H delay) respectively. Then, the gates 48 and 49 are gated by the gate pulses of two outputs of the flip-flop 45 (output as shown in FIG. 13*n* and that which is 180° out of phase therewith) so that the outputs of these gates 48 and 49 become X_X_X_..... and X′_X′_X′..... respectively. These X, X′ signals are converted to a continuous signal XX′XX′XX′ ..... in mixer 52. The remaining gates 50 and 51 are also gated in the same manner so that the output of a mixer 53 becomes a continuous signal Z′Z Z′Z Z′Z....... Such FM (XX′ ...) and FM (ZZ′ ....) signals are demodulated by FM-demodulators 54 and 55, respectively and then shaped by clampers 56 and 57 with the aid of the H-sync pulses (FIG. 11*f*). Thereafter, chrominance signals X and Z are obtained at terminals 58 and 59, respectively. The reproduced signals Y, X, Z are supplied to a color television set to produce a color picture. The system for transforming the signals Y, X, Z to a line-sequential combined signal such as Y+FM (X/Z) will be referred to as encoder, and the system for converting the line-sequential combined signal to Y, X, Z signals will be referred to as decoder hereinafter.

Most of the circuits used in the encoder and decoder are well known in the art. FIG. 14 shown by way of example the gates 30 and 40 of FIG. 10, gates 48–51 of FIG. 12, and pulse amplifier and resonance circuits 43, 44 of FIG. 12, using transistors. The gate circuit has input and output terminals 60 and 61. Use is made of a transistor 62 of which the impedance between the collector and the emitter is substantially zero or infinite, and a gate signal as shown in FIG. 13*p* is applied to the base of the transistor. This results in a sufficient on-off ration at high frequency which could not be achieved by the conventional method and simplifies the circuit. The pulse amplifier-resonance circuit arrangement comprises an amplifier formed by a transistor and resonance elements connected with the collector of the transistor, so that waveform similar to that shown in FIG. 13*n* is taken from an input signal such as shown in FIG. 13*m*. The resonance circuit is resonant at about 100 kHz. to absorb the energy of the horizontal synchronizing signals per se. The 1H delay line used in the decoder may be a supersonic delay line consisting of a propagating medium such as glass.

Figure 15R:
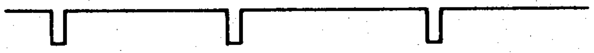

The Y, X, Z-signals reproduced in the above manner have not sufficiently been processed as yet. That is even if the signals are shaped by the circuits such as clampers, etc., there is a tendency that pulses indicated at *q*′ in FIG. 15*q* which are left nonprocessed in the gate circuits remain in those portions of the Y-signals which equivalently correspond to the horizontal synchronizing signals, as will be seen from the signal X (XX′ ...) shown in FIG. 15. This is true of the signal Z (ZZ′ ...). These residual pulses *q*′ change the average levels of the signals X, Z and deteriorate the white-balance when they enter a color television set, so that color reproduction with fidelity becomes impossible.

Therefore, it is necessary to apply a signal which offsets the changes in the average levels due to the residual pulses. FIG. 16 shows the circuit arrangement for producing such offset signal. If the horizontal synchronizing pulses shown in FIG. 13*m* are applied to the input of the circuit, pulses of FIGS. 15*r* and 15*r*′ which are reversals of each other are available at the output side of the circuit. These pulses are taken out by selecting KP or KP′ which offsets changes in the average values due to the residual pulses by means of a variable resistor 62′, thereby offsetting changes in the average levels due to the residual pulses to always reduce the average level to zero. The output of the variable resistor 62′ is applied between the clampers 56, 57 and the output terminals 58, 59.

In the manner as described above, the line-sequential color system stabilizes the color reproduction. Furthermore, the following method is adopted to make it possible to effect color control. A carrier color signal which is obtained by quadrature-balance-modulating one carrier with two chrominance signals requires, when demodulated in a receiver, a subcarrier serving as the reference. In the case of NTSC, to meet this requirement, a composite color signal includes about eight waves of such subcarrier which are inserted at the back porch of horizontal synchronizing signals as burst signal.

In the receiver, a continuous reference wave is formed by the burst signal to carry out synchronous detection. At this time, the phase is changed from the burst reference phase, and X, Z or color difference signals are demodulated, instead of demodulating the two chrominance signals I, Q as transmitted.

As well known in the art, according to the NTSC color television system, the carrier chrominance signal (equivalent to I, Q) applied to a chrominance signal demodulator is given by $$\frac{R-Y}{1.14}\cos\omega_s t+\frac{B-Y}{2.03}\sin\omega_s t$$

where $\omega_s$=the angular frequency of the color subcarrier $Y$=0.30R+0.59G+0.11B $R, G, B$ = respective monochrome signal outputs Assume that the reference subcarrier applied to the demodulator is represented by E $\sin(\omega_s t+\theta)$ leading in phase by $\theta$ with respect to the subcarrier modulated with the chrominance signal (B−Y)/2.03. Then the chrominance signal appearing at the output of the demodulator is given by $$\frac{B-Y}{2.03}\cos\theta+\frac{R-Y}{1.14}\sin\theta$$

For example, when $\theta$ is $\theta_{1x}$=260.5° and $\theta_{1z}$=203°, the demodulation outputs are −X and −Z. This indicates the same operation as that of a receiver according to the XZ-demodulation system. For tint (color) adjustment in the receiver, the hue is changed by changing the ratio of the demodulation outputs R−Y and B−Y by changing $\theta_{1x}\pm\Delta\theta$ and $\theta_{1z}\pm\Delta\theta$ with $\theta_{1x}-\theta_{1z}$ = constant. This means that the phase of the reference subcarrier can be changed in the receiver. FIG. 17 is a graph showing $$\frac{R-Y}{1.14}\sin\theta \quad \text{and} \quad \frac{B-Y}{2.03}\cos\theta$$

in the neighborhood of the −X and −Z-demodulation outputs in terms of $\theta$. From this, the relationship between the phase $\theta$ of the reference subcarrier and the demodulator output can be determined.

In the line-sequential system, the tint adjustment cannot be achieved by changing $\theta$ since signals obtained by demodulating Y, X, Z or Y, I, Q are handled. Similar tint adjustment effect to that produced by changing $\theta$ can be produced by the use of the following system. FIG. 18 is a graph showing −X±K for −Z-signal and −Z±K for −X-signal. By comparing FIGS. 17 and 18, the following can be seen. That is, $$\left| \frac{R-Y}{1.14} \sin\theta \right|$$

for −X and −Z is increased with increase in $\theta$ in the neighborhood of $\theta_{1x}$ and $\theta_{1z}$ on which −X and −Z depend respectively, where $$\frac{R-Y}{1.14} \sin\theta$$

is negative, while $$\left| \frac{B-Y}{2.03} \cos\theta \right|$$

for −X and −Z is decreased toward zero. Further, the tendency of FIGS. 17 and 18 remains substantially the same for −X±K(Z) with respect to changes in the positive value of K and −Z±K(−X) are mixed with −X and −Z demodulated at $\theta_{1x}$ and $\theta_{1z}$ respectively. Since the differential coefficients of sin $\theta$ and cos $\theta$ in the vicinity of $\theta$=180° and 270° have different values, the above is not the case, but the differential coefficients are small, and therefore the degree of change is low so that the tendency may be considered to be similar. With the foregoing signal-processing system, similar tint adjustment to that in the receiver can be achieved by the circuit operations corresponding to −X±K(−Z) and −Z±K(−X).

Figure 19 is a block diagram showing a circuit constructed for the above purpose, and Figure 20 shows an amplifier circuit capable of performing the ±K operation. −X and −Z are applied to terminals 63 and 64 and applied to ±K operation amplifiers 67 and 68 each of which is adapted for ±K operation since outputs appearing at the collector and emitter thereof are of opposite polarities. The outputs of these amplifiers become zero when variable resistors 71 and 72 have their taps located at the center. Thus, by mixing ±K(−X) and ±K(−Z)outputs into the −X and −Z-outputs of the amplifiers 65 and 66 in mixers 69 and 70 respectively, desired signals can be obtained at terminals 73 and 74. In order to obtain −Z∓K(−X) for −X±K(−Z), the variable resistors 71 and 72 are constructed in reversely interlocking relationship with each other. This circuit is connected with terminals 58 and 59 of the decoder (FIG. 12). In order to perform the above operation in a receiver, the circuit may be provided at the X, Z-demodulation output side. Through the above additional operation, the tint adjustment becomes possible. Obviously, the present method can equally be applied to signals such as R−Y, B−Y. The line-sequential color television system can be constructed by incorporating the above-described various devices. That is, the encoder system is provided at the transmitting side and the decoder system is provided at the receiving side. Now, description will be made of the modulation recording and reproducing method as applied not to the broadcasting transmission system but to the wide-band magnetic recording and reproducing apparatus described earlier with reference to FIGS. 1 to 5. The encoder output signal Y+FM(X/Z) is again frequency-modulated so as to be recorded and reproduced. Y+FM(X/Y) signal is processed by the decoder to achieve color reproduction in the receiver.

FIG. 21 is a block diagram of the FM-recording-reproducing circuit. FIG. 22 shows an example of the major circuit of the FM-system using transistors.

The encoder output or Y+FM(X/Z) signal is supplied to a terminal 75 and modulated by an FM-modulator 76 in which it is frequency-deviated to 4–5.5 MHz for example with a signal to be modulated. The modulated signal is amplified in a recording amplifier 77 and then recorded on a magnetic tape by means of magnetic recording heads 4 and 5.

In the playback operation, the heads 4 and 5 serve as playback heads. The modulated signal reproduced by the heads are passed through a head amplifier 78 and a limiter 79 to eliminate unwanted AM-components and then applied to a demodulator 80 so that the Y+FM(X/Y) signal is obtained at a terminal 81 as demodulated signal, which in turn is processed in the decoder.

The major circuit shown in Figure 22 is well known in the art. That is, in the modulator, the base of transistors constituting an astable multivibrator is driven by a signal to be modulated. In the demodulator, use is made of frequency-doubling and area-detection. Any unwanted beat components occurring in said FM-system can be effectively suppressed by the precise adjustment of balancers 82–85 and the operational conditions of the transistors.

By selecting the diameter of the rotary drum 2 to 15 cm. Φ and the rotational frequency to 1,800 r.p.m. and using magnetic heads formed of ferrite with a track width of about 150$\mu$ and a gap width of 0.5~1$\mu$, said results can be attained at the present technical level.

Figure 23:
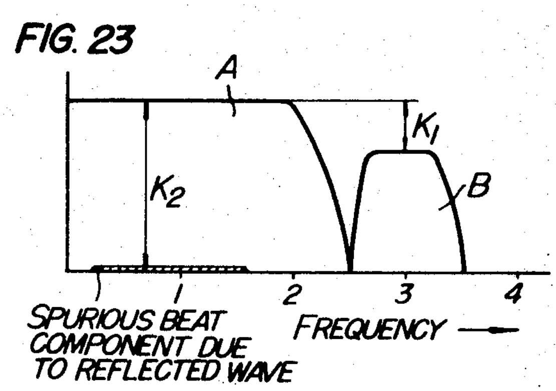
Figure 22:
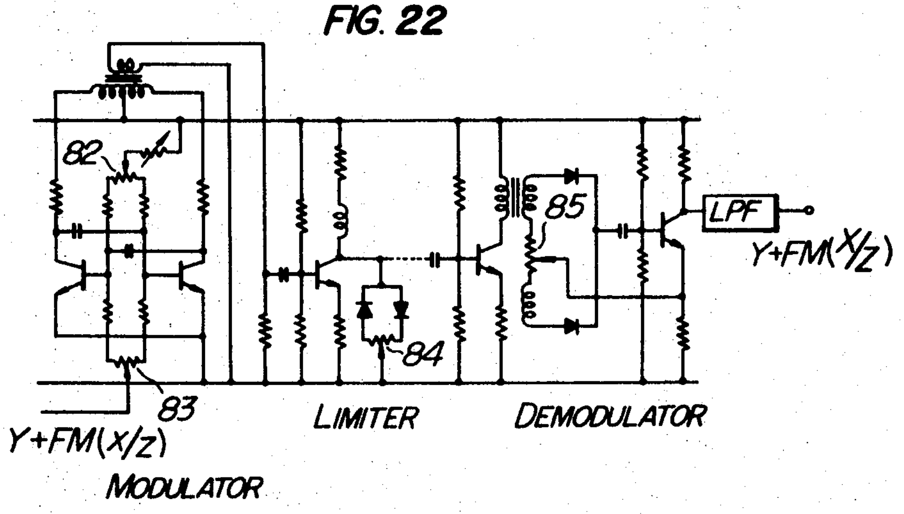
Figures 23S, 23T:
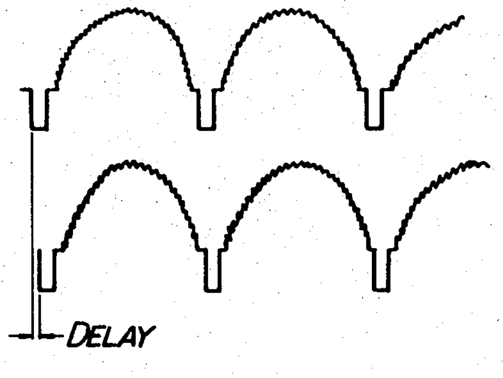
Figure 23U:
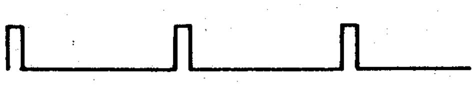
Figure 23V:
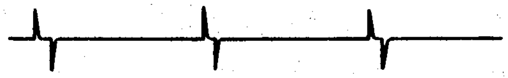

When a line-sequential color television signal produced in accordance with the present invention is recorded or reproduced in the foregoing wide-band magnetic recording and reproducing apparatus, said encoder and decoder systems can be made integral with the FM-system circuit so that the circuit arrangement can be simplified. For example, the horizontal sync-separator may be common to the encoder and decoder. Further, the index pulse signal may be formed by virtue of the difference in delay time between the input and output signals of the FM-system circuit. In FIG. 23, FIG. **23*S* shows the time delay of the output Y on the encoder side, and FIG. 23*T* shows the time delay of the output of the input Y on the decoder side. Horizontal synchronizing pulses of FIG. 23*V* are separated from the waveform of FIG. 23*T* and differentiated to be as shown in FIG. 23*V*. The resulting index pulse signal can be inserted in the horizontal signals of the waveform shown in FIG. 23*S***.

In the foregoing, description has been made of the line-sequential color television system embodying the present invention and the method of recording/reproducing signals produced by such system. Various changes and modifications will become possible without departing from the spirit of the present invention, and it is understood that such changes and modifications constitute part of this invention.

What is claimed is:

1. In a line-sequential color television system comprising means for transmitting a first signal comprising a luminance signal component and a second signal comprising a line-sequential chrominance signal component including two chrominance signal components through not more than two channels, said first and second signals representing complete color information and further comprising means for processing said first and second signals to reproduce a luminance signal component and a line-sequential chrominance signal component including two chrominance signal components, said two chrominance signal components carrying the simultaneous chrominance information in respective line pairs, the improvement comprising in combination: means for separating a horizontal synchronizing pulse signal from said first signal; means for producing at least two gate drive pulse train signals in synchronism with said horizontal synchronizing signal; gate means for gating said two chrominance signal components in response to said gate drive pulse signals to produce a first sequence of alternating lines of said first chrominance component and of voids and a second sequence of alternating lines of said second chrominance component and of voids, said first and second sequences of lines being deviated from each other by a time period equal to one horizontal scanning line in respect of the void line so as not to simultaneously include their color information; means for mixing said gated first and second chrominance signal components to produce a complete line-sequential chrominance signal; means for generating a second pulse signal in synchronism with and time-delayed with respect to one of the leading and trailing edges of said gate drive pulse signals, said time delay being not greater than the pulse width of said horizontal synchronizing pulse signal; and means for superposing said second pulse signal on said horizontal synchronizing pulse of said first signal whereby said second pulse signal serves as an index signal representative of that one of said two chrominance signal components which is being included in a given horizontal scanning line.

2. A system as defined in claim 1, further comprising means for magnetically recording and reproducing said color information.

3. A system as defined in claim 1, further comprising means for separating said second pulse signal and horizontal sync pulse signal from the composite signal comprising said first and second signals; means for producing at least two pulse train signals having a pulse width and a pulse interval approximately equal to one horizontal scanning line period; means for delaying said second signal one horizontal scanning line period to separate said second signal into at least two chrominance signal sequences through gate means each having pairs of successive two lines carrying the simultaneous color information; and means for reproducing at least two chrominance signal components from said sequences.

4. A system as defined in claim 3, further comprising means for producing at least two pulse signals of opposite phases in synchronism with said separated horizontal sync pulse signal; means for mixing said opposite phase signals in a predetermined ratio; and means for superposing said mixed pulse signals to cancel undesirable pulses remaining on those portions of said two chrominance signal sequences which correspond to horizontal synchronizing pulse signal portions of the blanking portions of the video signal under reception.

5. A color television system having a color television signal comprising one luminance signal and first and second chrominance signals; means for mixing a portion of said first chrominance signal with said second chrominance signal; means for mixing a portion of said second chrominance signal with said first chrominance signal; and means to vary the relative amounts of the mixed signals to thereby adjust tint.

* * * * *